United States Patent [19]

Kinoshita

[11] Patent Number: 5,057,663
[45] Date of Patent: Oct. 15, 1991

[54] AUTOMATIC WIRE EXTENSION METHOD

[75] Inventor: Hiroshi Kinoshita, Omuta, Japan

[73] Assignee: Fanuc Ltd., Yamanashi, Japan

[21] Appl. No.: 459,801

[22] PCT Filed: Oct. 4, 1989

[86] PCT No.: PCT/JP89/01019
§ 371 Date: May 10, 1990
§ 102(e) Date: May 10, 1990

[87] PCT Pub. No.: WO90/03862
PCT Pub. Date: Apr. 19, 1990

[30] Foreign Application Priority Data

Oct. 8, 1988 [JP] Japan .................. 63-252983

[51] Int. Cl.⁵ .............................. B23H 7/10
[52] U.S. Cl. ................................ 219/69.12
[58] Field of Search ............... 219/69.12, 69.14, 69.17

[56] References Cited

U.S. PATENT DOCUMENTS 4,877,935  10/1989  Aso et al. ............ 219/69.12

FOREIGN PATENT DOCUMENTS 186324    9/1985  Japan ................ 219/69.12
62-18291  4/1987  Japan .
94225     4/1987  Japan ................ 219/69.17
62-47135  10/1987 Japan .
63-48652  9/1988  Japan .
312024    12/1988 Japan ................ 219/69.12
11730     1/1989  Japan ................ 219/69.12

Primary Examiner—Geoffrey S. Evans
Attorney, Agent, or Firm—Staas & Halsey

[57] ABSTRACT

An automatic wire extension method capable of effecting reliable and smooth wire extension regardless of the size of the diameter of an initial hole and even with use of an inexpensive apparatus, such that during the wire extension through an initial hole having a normal diameter, when a wire electrode is fed while a machining fluid is injected toward a workpiece (50) from a wire extension nozzle (120) attached to an upper wire guide (30) and set apart from the workpiece, the wire electrode is reliably threaded into the initial hole (51) and a wire passage of a three-point support guide (72) accommodated in a lower wire guide, due to a wire guiding function provided by the machining fluid jet. A wire extension through a small-diameter initial hole, when a wire extension nozzle (120) having a nozzle hole (125) with a diameter smaller than that of the initial hole (51) is attached to the upper wire guide, and the wire electrode is fed through the nozzle with the nozzle positioned close to the workpiece and with the supply of the machining fluid interrupted, the wire electrode is threaded into the small-diameter machining hole close to the nozzle, and then into the wire passage of the lower wire guide due to a wire guiding function provided by the initial hole.

8 Claims, 5 Drawing Sheets

AUTOMATIC WIRE EXTENSION METHOD

BACKGROUND OF THE INVENTION

1. Field of the Invention

The present invention relates to an automatic wire extension method for a wire cut electric discharge machine.

2. Description of the Related Art

Generally, wire cut electric discharge machines comprise upper and lower wire guides, respectively disposed above and under a worktable on which a workpiece is fixed and individually formed with a wire passage for guiding a wire electrode (hereinafter referred to as wire). These machines are arranged to generate an electric discharge between the wire and the workpiece, while delivering the wire threaded beforehand through the wire passages and an initial hole formed in the workpiece for machining, to thereby effect electric discharge machining. They are further arranged to inject machining fluid from upper and lower nozzles, respectively provided at the upper and lower wire guides, toward an electric discharge machining region.

In electric discharge machines of this type, disconnection of the wire may occur during electric discharge machining. In the case of manufacturing plural products from one workpiece, moreover, the wire is intentionally cut every time the machining operation for one product is completed. In this respect, to extend the wire that has been disconnected by accident or intentionally between the two wire guides, the electric discharge machine is provided with an automatic wire extension apparatus for threading the wire fed through the upper wire guide while the wire is restricted by the machining fluid jetted from a wire extension nozzle attached to the upper nozzle into the initial hole of the workpiece and then into the wire passage of the lower wire guide.

In such wire extension apparatuses, generally, wire extension is more likely to be successfully carried out as the diameter of the initial hole is increased. In the case of manufacturing ordinary products by electric discharge machining, initial holes with a relatively large diameter may be formed, and therefore, wire extension can be achieved at a practically satisfactory rate. However, when manufacturing products requiring extremely precise machining, such as lead frames of integrated circuits, the diameter of the initial hole must be, in some cases, be smaller than the nozzle hole diameter of the wire extension nozzle. In such cases, the diameter of the nozzle hole (the diameter of the machining fluid jet) is larger than that of the initial hole, whereas the wire, when fed toward the initial hole, is displaceable in the diametrical direction of the jet despite the restriction by the jet. As a result, the wire is likely to be deviated from the initial hole in the diametrical direction of the jet (initial hole) when it reaches the upper surface of the workpiece, frequently causing the situation that the wire strikes against the upper surface of the workpiece and thus wire extension ends in failure.

In view of this, the diameter of the jet may be made smaller than that of the initial hole, by using a wire extension nozzle having a smaller nozzle hole diameter. If the diameter of the machining fluid jet (the diameter of the nozzle hole) is reduced, however, the area in the horizontal sectional area of the jet occupied by the wire increases. Therefore, the resistance which the machining fluid receives when passing through the initial hole is increased, resulting in an increase in the machining fluid pressure. For instance, when the wire diameter is 0.2 mm and the diameter of the nozzle hole is 0.3 mm, the machining fluid pressure is about 43 times as high as that when the diameter of the nozzle hole is 1.5 mm. If the machining fluid pressure is increased, the machining fluid leaks from between the upper nozzle and the wire extension nozzle. To prevent this, the fitting portions of these parts must be designed to be watertight and a high discharge pressure pump must be used for injecting the machining fluid, thus increasing the cost of the automatic wire extension apparatus. Further, wires having a diameter larger than the nozzle hole diameter are unusable, as they cannot be passed through the nozzle. If the diameter of the nozzle hole (the diameter of the jet) is small, the wire guiding function of the machining fluid jet is lowered, as mentioned above. Thus, by merely using a wire extension nozzle with a small nozzle hole to allow the wire to be inserted into an initial hole having a small diameter, disadvantages arise in that restriction is imposed on the diameters of wires usable for the manufacture of ordinary products, and that a required wire guiding function cannot be achieved by the machining fluid jet.

SUMMARY OF THE INVENTION

An object of the present invention is to provide an automatic wire extension method which permits a reliable and smooth wire extension, regardless of the size of the diameter of an initial hole for machining and even with use of an inexpensive apparatus.

To achieve the above object, according to a first aspect of the present invention, there is provided an automatic wire extension method which comprises the steps of: (a) attaching a first nozzle to an upper wire guide when carrying out normal wire extension through a first initial hole having a diameter suited to normal electric discharge machining, and attaching a second nozzle, having a predetermined nozzle hole diameter smaller than the diameter of a second initial hole, to the upper wire guide when carrying out specific wire extension through the second initial hole whose diameter is smaller than that of the first initial hole and suited to specific electric discharge machining; (b) positioning the first nozzle at a first predetermined distance from a workpiece when carrying out the normal wire extension, and positioning the second nozzle at a second predetermined distance smaller than the first predetermined distance, from the workpiece when carrying out the specific wire extension; and (c) feeding a wire electrode through the upper wire guide to the workpiece and then to a lower wire guide while injecting a machining fluid from the first nozzle toward the workpiece when carrying out the normal wire extension, and effecting the wire electrode feeding, with the injection of the machining fluid interrupted, when carrying out the specific wire extension.

According to another aspect of the invention, there is provided an automatic wire extension method which comprises the steps of: (a) attaching a main nozzle to an upper wire guide when carrying out normal wire extension through a first initial hole having a diameter suited to normal electric discharge machining, and attaching a subnozzle, having a predetermined nozzle hole diameter smaller than a diameter of a second initial hole, to the main nozzle mounted to the upper wire guide when carrying out precision wire extension through the second initial hole whose diameter is smaller than that of the first initial hole and suited to precision electric discharge machining; (b) positioning the main nozzle at a first predetermined distance from a workpiece when carrying out the normal wire extension, and positioning the subnozzle at a second predetermined distance smaller than the first predetermined distance, from the workpiece when carrying out the precision wire extension; and (c) feeding a wire electrode through the upper wire guide to the workpiece and then to a lower wire guide while injecting a machining fluid from the main nozzle toward the workpiece when carrying out the normal wire extension, and effecting the wire electrode feeding, with the injection of the machining fluid interrupted, when carrying out the precision wire extension.

As described above, according to the present invention, normal wire extension through an initial hole having a normal diameter is carried out by feeding the wire electrode while the machining fluid is injected from the normal nozzle positioned at the predetermined distance from the workpiece. To carry out the precision wire extension through an initial hole having a smaller diameter, the normal nozzle is replaced with a precision nozzle having a nozzle hole smaller in diameter than the initial hole, or the subnozzle is attached to the normal nozzle. Then, the precision nozzle or subnozzle is positioned close to the workpiece and the wire electrode is fed with the injection of the machining fluid interrupted. Accordingly, not only the normal wire extension can be effected accurately and smoothly by utilizing the wire guiding function of the machining fluid, but also the precision wire extension can be accurately and smoothly executed, because the wire is inserted into a small initial hole formed in the workpiece through the precision nozzle or subnozzle positioned close to the workpiece and having a nozzle hole smaller in diameter than the initial hole, and further inserted into the lower wire guide through the small initial hole which then serves to guide the wire. Moreover, since the machining fluid is injected only during normal wire extension at a pressure just enough for this purpose, it is not necessary to design the fitting portions of the upper wire guide and the normal nozzle, the fitting portions of the upper wire guide and the precision nozzle, and the fitting portions of the normal nozzle and the subnozzle to be watertight, or to use a pump having a high discharge pressure for feeding the machining fluid. Accordingly, the method of the invention can be carried out with an inexpensive apparatus.

DETAILED DESCRIPTION OF THE PREFERRED EMBODIMENTS

Figure 1:
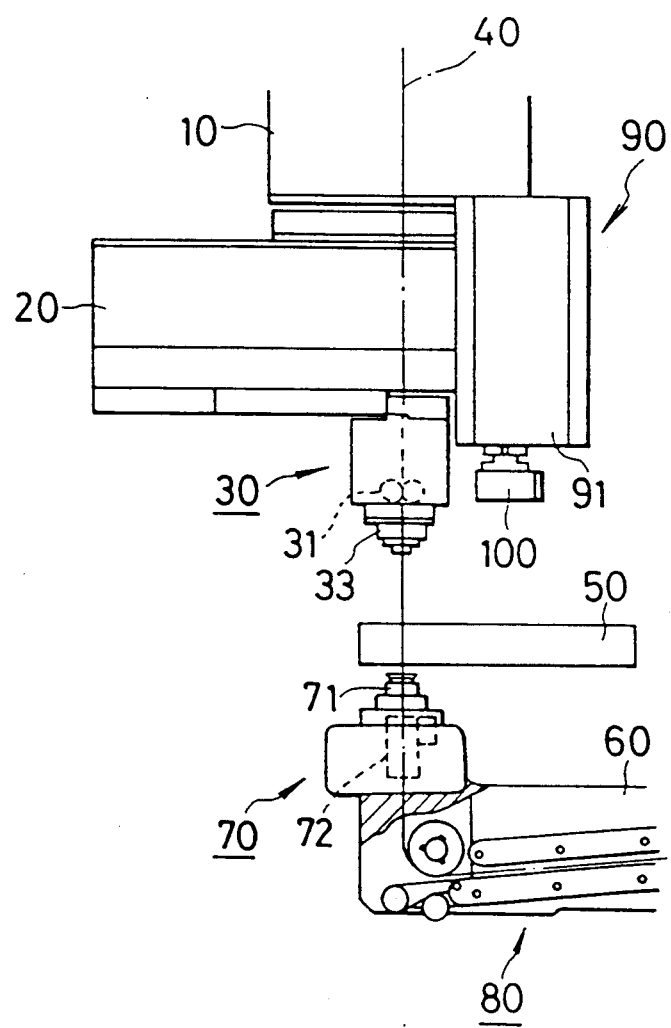
FIG. 1 is a partly broken schematic front view showing a principal part of a wire cut electric discharge machine, in a condition where no wire threading operation is performed, for embodying an automatic wire extension method according to an embodiment of the present invention is applied.
Figure 2:
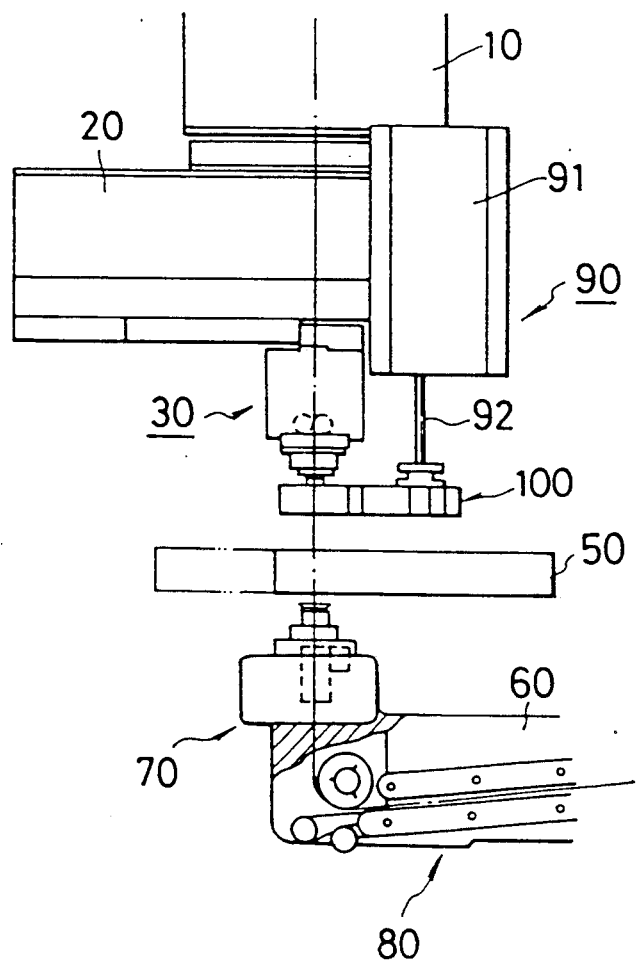
FIG. 2 is a view similar to FIG. 1, showing the electric discharge machine of FIG. 1 in a condition where wire threading operation is carried out.

Referring to FIGS. 1 and 2, a wire cut electric discharge machine to which an automatic wire extension method according to an embodiment of the present invention is applied is basically so arranged as to be similar to that disclosed in International Patent Application No. PCT/JP86/433 filed under the Patent Cooperation Treaty. Specifically, the electric discharge machine comprises a Z axis unit 10 mounted to an upper column (not shown) in a manner vertically movable relative thereto, and a UV axis unit 20 mounted to the Z axis unit 10 in a manner movable in unison therewith in the vertical direction and also movable relative thereto in the horizontal direction. An upper wire guide 30 is mounted to the unit 20 so as to be movable in unison therewith.

Figure 3:
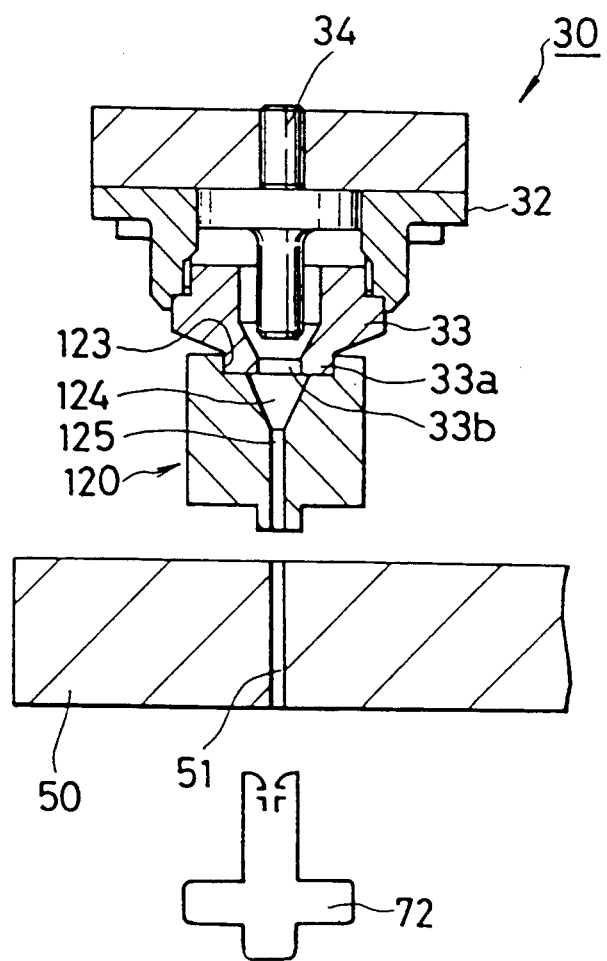
FIG. 3 is a fragmentary sectional front view showing principal parts of upper and lower wire guides of the electric discharge machine in FIG. 1 together with a workpiece.

The upper wire guide 30 is formed as a hollow cylinder as a whole, and accommodates therein a pair of hold rollers 31 for holding a wire electrode (hereinafter referred to as a wire) therebetween and for feeding the same downwardly during the below-mentioned wire extension operation. The hold rollers are movable toward and away from each other and are coupled together through a one-way clutch (not shown) which is arranged to be engaged when the rollers rotate in wire feed directions. As shown in FIG. 3, the upper wire guide 30 has an annular holder 32 at a lower portion thereof, and an upper nozzle 33 and a die guide 34 formed with a wire passage (not shown) are fitted in the holder 32, the elements 32-34 being disposed in alignment with each other. A machining fluid, supplied to the upper wire guide 30 through a pipe (not shown) is injected toward a workpiece 50 fixed on a work table (not shown) through the wire passage of the die guide 34 and the upper nozzle 33.

The electric discharge machine further comprises a lower wire guide 70 secured to a lower column 60 under the worktable. The lower wire guide has a lower nozzle 71 at an inner end thereof and accommodates therein a three-point support guide 72, which is disposed in alignment with the upper nozzle 33 and the die guide 34 accommodated in the nozzle 33 (see FIG. 3). Disposed at the downstream side of the lower wire guide 70 is a belt type wire delivery apparatus 80 composed of a pair of belts. These belts, which are movable toward and away from each other, are adapted to travel, during automatic wire extension, in a condition that they are urged into contact with each other through the wire 40, thereby delivering the same wire.

Figure 4:
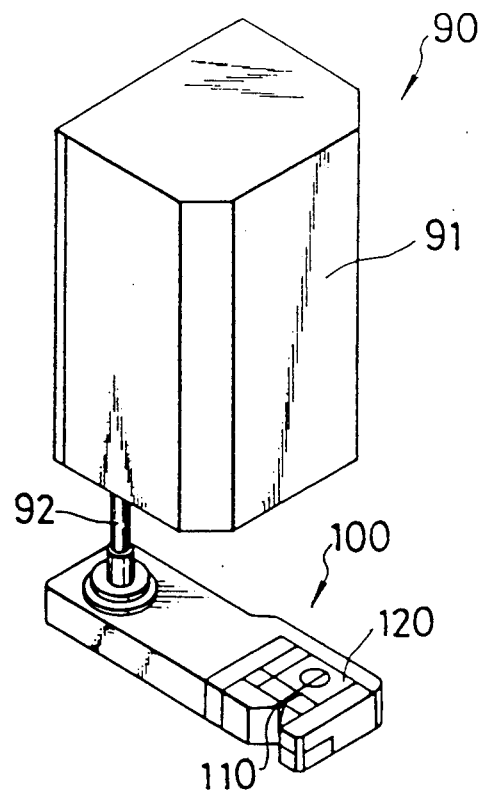
FIG. 4 is a perspective view showing an automatic wire extension unit of the electric discharge machine of FIG. 1.
Figure 5:
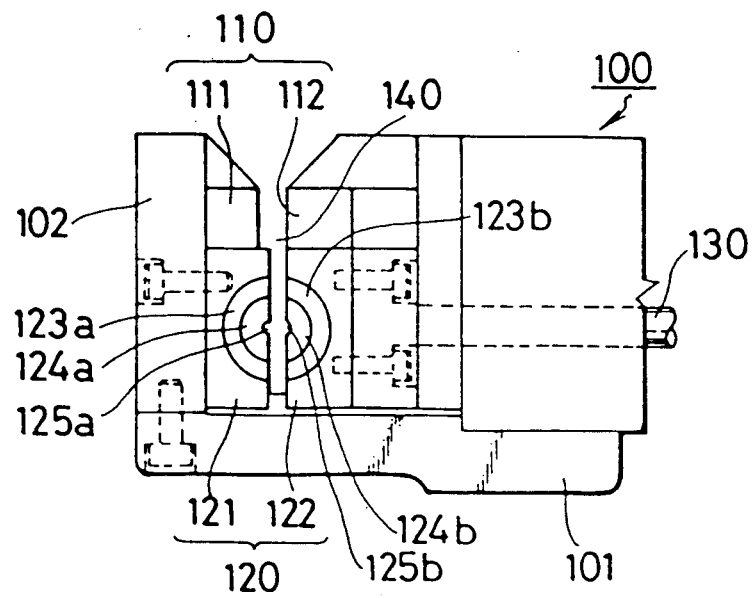
FIG. 5 is a fragmentary plan view showing a part of an arm assembly of the unit of FIG. 4.

The electric discharge machine is further provided with an automatic wire extension unit 90 having a housing 91 which is secured to the UV axis unit 20 and to which a motor and a first piston-cylinder assembly (neither is shown) are mounted. A rod 92, which is rotatable in unison with the rotary shaft of the motor and axially movable relative thereto, has a lower end to which one end portion of an arm assembly 100 is secured, whereby the arm assembly 100 is caused to be rotated by the motor and vertically moved by the first piston-cylinder assembly. As shown in FIGS. 4 and 5, the arm assembly 100 is provided at the other end portion thereof on its outer side in the width direction of the same with a wire cutting unit 110 which consists of a stationary cutter 111 and a movable cutter 112, and is provided at its inner side in the width direction thereof with a wire extension nozzle 120 consisting of a stationary nozzle portion 121 and a movable nozzle portion 122.

More specifically, the stationary cutter 111 is secured to a frame member 102 which is detachably coupled to one end of an arm assembly body 101 by a bolt, and the movable cutter 112 is secured to the distal end of a piston rod of a second piston-cylinder assembly (not shown), secured to the assembly body 101, such that as the piston reciprocates, the movable cutter 112 is moved toward and away from the stationary cutter 111 in unison with the piston rod. The stationary nozzle portion 121 is detachable coupled to the frame member 102 by a bolt, and the movable nozzle portion 122 is detachable coupled by bolts to the distal end of a piston rod 130 of a third piston-cylinder assembly secured to the assembly body 101. As the piston laterally reciprocates, the movable nozzle portion 122 is moved toward and away from the stationary nozzle portion 121 in unison with the piston rod 130. The cutters 111 and 112 and the nozzle portions 121 and 122 are so arranged that when they are set apart from their counterparts, a slit 140 is defined between the opposed faces of these elements to allow the wire 40 to be passed therethrough. The nozzle portions 121 and 122 are formed at their opposed surfaces with semicylindrical holes 123a, 123b, inverted semi-conical holes 124a, 124b, and small-diameter semicylindrical holes 125a, 125b in the mentioned order from the top of these portions to their bottom, so as to respectively define a cylindrical hole 123 into which an annular end 33a of the upper nozzle 33 is closely fitted, an inverted-cone shaped hole 124 communicating with a nozzle hole 33b of the upper nozzle 33, and a nozzle hole 125 communicating with the hole 124 when the movable nozzle portion 122 is brought into contact with the stationary nozzle portion 121.

Although illustration is omitted, the electric discharge machine further includes a numerical control unit which is electrically connected to various operating sections of the electric discharge machine, such as the movable parts of the Z axis unit 10, UV axis unit 20, hold rollers 31, wire table, and three-point support guide 72, the power sources (e.g., motor, piston-cylinder assembly, etc.) of the wire delivery apparatus 80 and automatic wire extension unit, an electric discharge power supply, a machining fluid supply system, and a sensor system.

In the following description, operation of the wire cut electric discharge machine with the above construction will now be explained.

During electric discharge machining, electric discharge is caused to be generated between the wire 40 and the workpiece 50 while the wire 40 is caused to travel by a wire feeding device, not shown, with the arm assembly 100 of the automatic wire extension unit 90 retracted sideways as shown in FIG. 1. The machining fluid is injected from the upper and lower nozzles 33 and 71 toward the electric discharge machining region.

When manufacturing a plurality of products from a single workpiece 50, the wire 40 is cut off every time electric discharge machining is completed for one product, and then wire extension is carried out in a mode determined in dependence on the diameter of the initial hole 51 (FIG. 3) for machining into which the wire 40 is to be inserted next. First, normal wire extension through an initial hole, having a normal diameter which is suitable for production of an ordinary product not requiring extremely precise machining or the like, will be described. Here, the dimensions of the elements associated with the normal wire extension are shown by way of example, which are as follows: the diameter of the initial hole is 2.0 mm or more, the wire diameter is 0.2 mm, the diameter of the nozzle hole of the upper nozzle 33 is 5.5 mm, the diameter of the nozzle hole of the wire extension nozzle 120 is 1.5 mm, and the diameter of the wire passage of the three-point support guide 72 is 4.5 mm.

When the electric discharge machining for one product is finished, the various operating sections of the electric discharge machine are sequentially operated as described below, in accordance with various control outputs from the numerical control unit. First, the operation of the machining fluid supply system and wire delivery apparatus is stopped, thereby interrupting the supply of the machining fluid and the feeding of the wire. Subsequently, as the Z axis unit 10 is raised the upper wire guide 30 is moved upward, and a pair of hold rollers 31 are driven to approach each other and thus hold the wire 40 therebetween. The arm assembly 100, which is then in a retracted position as shown in FIG. 1, is lowered by the first piston-cylinder assembly via the rod 92 of the automatic wire extension unit 90, and then swung by the motor until the cutters 111 and 112 come to a position just under the upper nozzle 33, whereby the wire 40 is set between the cutters 111 and 112 through the slit 140. Next, the movable cutter 112 is driven by the second piston-cylinder assembly, to cut the wire 40. After the arm assembly 100 is swung back toward the retracted position, the downstream side portion of the wire 40 thus cut is held between a pair of belts of the wire delivery apparatus 80, and then, the same apparatus 80 and a wire feed roller (not shown) are driven to discard the wire in a wire container (not shown).

Subsequently, the work table is moved in a horizontal plane in such a manner that the center of the initial hole 51, which is formed in the workpiece 50 and into which the wire 40 is to be inserted, is aligned with the axes of the upper and lower wire guides 30 and 70. The arm assembly 100 is again swung toward the upper wire guide, to bring the wire extension nozzle 120 to a position just under the upper nozzle 33. Next, the third piston-cylinder assembly is driven to bring the movable nozzle portion 122 into contact with the stationary nozzle portion 121, and with the wire 40 held in the nozzle hole 125 defined by these two nozzle portions, the arm assembly 100 is raised such that the cylindrical hole 123 in the upper surface of the wire extension nozzle fittedly receives the annular end 33a of the upper nozzle 33. Simultaneously, a movable piece (not shown) of the three-point support guide 72 is moved away from a stationary piece thereof (not shown), thus permitting insertion of the wire 40. The Z axis unit 10 is then lowered until the distance between the extreme end face of the wire extension nozzle 120 and the upper surface of the workpiece 50 becomes equal to a predetermined value (11 to 13 mm) suitable for a normal automatic wire extension process.

Thereafter, while the machining fluid is injected from the upper nozzle 33, the hold rollers 31 are rotated to feed the wire 40 toward the initial hole 51 and the lower wire guide 70. The wire 40, restrained by the jet of the machining fluid, is threaded into the initial hole 51 and is then inserted through the wire passage of the three-point support guide 72 and between the stationary piece and movable piece of same, to reach the wire feed roller 5 via the wire delivery apparatus 80, thus completing wire extension or wire threading.

Subsequently, after interrupting the supply of the machining fluid and stopping the rotation of the hold roller pair 31, the upper wire guide 30 is raised together with the Z axis unit 10. At this time, the one-way clutch provided between the two hold rollers 31 is disengaged and thus the hold rollers 31 run idle. Next, the arm assembly 100 is moved downward, resulting in the wire extension nozzle 120 is disengaged from the upper nozzle 33. Then, the movable nozzle portion 122 is moved away from the stationary nozzle portion 121 so as to permit passage of the wire 40 therebetween. Whereupon, the arm assembly 100 is swung back and then is raised up to the retracted position shown in FIG. 1. Simultaneously with this, the movable piece of the three-point support guide 72 is driven toward the stationary piece thereof to hold the wire 40 in a manner slidably movable therebetween, and the hold rollers 31 and the belts of the wire delivery apparatus 80 are driven in such directions that they are moved away from their counterparts, thereby releasing the wire 40 from the rollers and the belts. Finally, the upper wire guide 30 is lowered to a predetermined vertical position to await the electric discharge machining.

Next, operation of the electric discharge machine will be described referring to the case of precision wire extension through an initial hole having a small diameter, e.g., 0.5 mm, which is suitable for production of specific products requiring extremely precise machining, etc.

First, the nozzle portions 121, 122 of the nozzle 120 for the normal wire extension are respectively detached from the frame member 102 and the piston rod 130, which have been detached from the main body 101 of the arm assembly 100. In place of this nozzle, a precision nozzle (designated by the same numeral 120 as used for the normal nozzle for the sake of convenience) is attached, the specific nozzle having a nozzle hole diameter (e.g., 0.3 mm) smaller than the aforesaid small diameter of the initial hole 51 and having an arrangement similar to that of the normal nozzle in other respects. Then, the setting value for the distance between the nozzle end face and the upper surface of the workpiece is changed from a value of 11 to 13 mm suited for normal wire extension, to a value of 0.1 to 0.2 mm. Next, basically the same procedure as for normal wire extension already described is taken. In specific wire extension, however, the vertical position of the Z axis unit 10 is controlled when the same unit is moved downward such that the distance between the distal end face of the wire extension nozzle 120 and the upper surface of the workpiece is adjusted to the aforesaid set value of 0.1 to 0.2 mm, to thereby locate the nozzle 120 at a location close to the workpiece 50. In addition, the supply of the machining fluid from the upper nozzle 33 is interrupted.

Under these conditions, the hold rollers 31 are rotated to feed the wire 40 of 0.2 mm in diameter, for example, through the wire extension nozzle 120 fitted onto the upper nozzle 33 and having a nozzle hole diameter of 0.3 mm, for example, toward the initial hole 51 having a small diameter (e.g., 0.5 to 2 mm). Since the distance between the nozzle 120 and the workpiece 50 is as small as 0.1 to 0.2 mm, the wire 40 is permitted to be smoothly inserted into the initial hole 51 without striking against the upper surface of the workpiece, even when the leading end of the wire is deflected due to the tendency of the wire to coil up or curl deformation of the wire. As the wire 40 is further fed toward the lower wire guide 70 thereafter, it is passed through the wire passage and between the movable and stationary pieces of the three-point support guide 72 accommodated in the lower wire guide 70, without any difficulty despite the occurrence of deflection or run-out of the wire due to its curl deformation. In this manner, the passing of the wire can be smoothly effected, presumably because undesirable deflection of the wire is suppressed when the wire 40 passes through the small-diameter initial hole 51, in other words, the small-diameter initial hole 51 has a wire guiding function.

Figure 6:
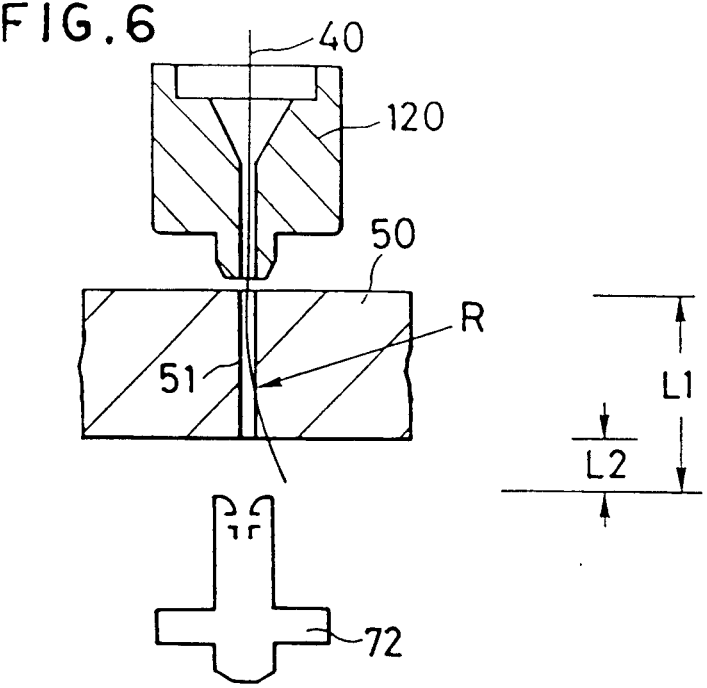
FIG. 6 is a diagram illustrating a wire guiding function of a small-diameter initial hole.

The wire guiding function of the initial hole 51 will be briefly described with reference to FIG. 6. In the figure, R represents the radius of an arc formed by the wire 40 in a free state, thus indicating the tendency of the wire to coil up, L1 represents the distance between the distal end face of the wire extension nozzle 120 and the upper surface of the three-point support guide 72, and L2 represents the distance between the lower surface of the workpiece 50 and the upper surface of the three-point support guide; here, R, L1, and L2 are 800 mm, 60 mm, and 6 mm, respectively.

Assuming that the workpiece 50 is not set, the wire 40 fed from the wire extension nozzle 120 is not restrained by the initial hole 51 of the workpiece and thus is in a free state, forming an arc with the radius R. As a result, the wire is deviated in the horizontal direction by about 1.8 mm from the axis of the three-point support guide 72 at the vertical position which is the same as that of the lower surface of the workpiece 50, and accordingly, is deviated by more than 1.8 mm at the vertical position corresponding to the upper surface of the three-point support guide 72. The radius of the wire passage of the three-point support guide 72 is 2.25 mm, and if the wire 40 is more likely to coil up (the radius R is smaller), it may not be successfully inserted into the three-point support guide. On the other hand, assuming that the workpiece 50 is set in position, namely, the wire 40 is inserted through the initial hole 51, the wire 40 remains restrained by the initial hole still at the vertical position of the lower surface of the workpiece. Accordingly, undesirable deflection of the wire 40 relative to the axis of the initial hole at the same vertical position is limited to a value (0.25 to 1.0 mm) equal to the radius of the initial hole. Consequently, deflection of the wire 40 at the inlet of the wire passage of the three-point support guide 72 is also restrained, whereby reliable wire insertion is ensured without the aid of the wire guiding function provided by the machining fluid jet.

When the wire 40 is disconnected by accident during the electric discharge machining, automatic wire extension is executed as in the case of intentional cutting of the wire 40. In this case, upon detecting a wire disconnection in a conventional manner, the downstream side portion of the disconnected wire 40 is discarded. Then, the arm assembly 100 is moved to the position for wire extension, shown in FIG. 2, following the aforementioned procedure, and the work table is driven such that the center of the initial hole 51, associated with the electric discharge machining interrupted by the disconnection of the wire, is in alignment with the axes of the upper nozzle 33 and wire extension nozzle 120. Subsequently, following the same procedure as described above, wire extension is carried out. This operation is apparent from the foregoing description, and hence an explanation thereof will be omitted herein.

Next, an automatic wire extension method according to a second embodiment of the present invention will be described.

The method of this embodiment is carried out by the use of an electric discharge machine having basically the same arrangement as that of the electric discharge machine already described with reference to FIGS. 1 through 5. However, as compared with the first embodiment where, among the wire extension nozzle 120 having nozzle holes of different diameters, a nozzle having a nozzle hole diameter which corresponds to the diameter of the initial hole 51 is selectively used, namely, the replacement of the nozzles 120 is performed, the second embodiment is different therefrom in that a main nozzle 120' having a nozzle hole diameter suited for normal wire extension which is effected through an initial hole having a diameter suited for normal electric discharge machining, and a subnozzle 150 having a smaller nozzle hole diameter are prepared, so that the main nozzle is used individually or in combination with the subnozzle in accordance with the diameter of the initial hole 51.

Figure 7:
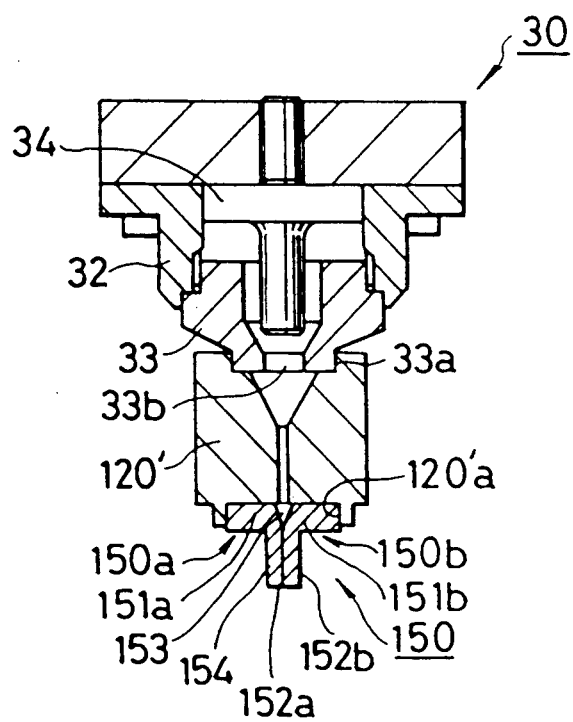
FIG. 7 is a fragmentary sectional front view showing a principal part of an upper wire guide of an electric discharge machine to which an automatic wire extension method according to a second embodiment of the invention is applied.

Referring to FIG. 7, the wire extension main nozzle 120' has substantially the same arrangement as the wire extension nozzle 120 shown in FIG. 3, except that a cylindrical recess 120'a is formed in the lower surface of the nozzle in communication with the nozzle hole. Specifically, a semicylindrical recess is formed in the lower surface of each of the stationary and movable nozzle portions of the main nozzle 120', such that the recess 120'a is defined by these two recesses when the nozzle portions are brought into contact with each other. The subnozzle 150 is composed of two separate halves 150a and 150b symmetrical with respect to a plane passing the axis thereof. Each subnozzle half 150a, 150b consists of a semicylindrical main body 151a, 151b and a semicylindrical extension 152a, 152b formed integrally and coaxially therewith, such that the main bodies 151a, 151b are detachably fitted into the recess 120'a of the main nozzle 120' when these subnozzle halves 150a, 150b are brought into contact with each other. Formed in each of the opposed faces of the subnozzle halves 150a, 150b are an inverted semi-conical hole opening in the upper surface of the main body 151a, 151b, and a small-diameter semicylindrical hole communicating at one end with the inverted semi-conical hole and opening at the other end in the lower surface of the extension 152a, 152b. An inverted cone-like hole 153 and a small-diameter cylindrical subnozzle hole 154 are defined in alignment with the axis of the subnozzle which is coaxial with the nozzle hole 33b of the upper nozzle 33 when the subnozzle 150a is fitted into the main nozzle 120' with the subnozzle halves 150a and 150b joined together. For instance, the hole 153 has its diameter of 1.5 mm at the side thereof facing the upper surface of the subnozzle, and the diameter of 0.3 mm at its extension side, and the diameter of the hole 154 is 0.3 mm.

In the case of effecting the normal wire extension through the initial hole 51 suitable for the normal electic discharge machining when the wire 40 is intentionally cut off or is disconnected by accident, the wire extension is carried out by procedures similar to those of the first embodiment with the use of the main nozzle 120' alone, corresponding to the wire extension nozzle 120 of the first embodiment. The operation performed in this case is apparent from the foregoing description, and therefore, an explanation thereof will be omitted here.

On the other hand, in case that precision wire extension is effected through a small-diameter initial hole 51 suited for precision electric discharge machining requiring extremely precise machining, etc., when the wire is intentionally or accidentally disconnected, the main nozzle 120' and the subnozzle 150 are used in combination. To this end, the setting value for the distance between the distal end face of the subnozzle 150 and the upper surface of the workpiece 50 is previously set to 0.1 to 0.2 mm, which is to be referred to by a computer of the numerical control unit for control of the vertical movement of the Z axis unit 10. The subnozzle 150 is fitted onto the bottom of the main nozzle 120', with the wire 40 held in the nozzle hole of the main nozzle 120' and with the main nozzle 120' fitted to the upper nozzle 33 by operating the automatic wire extension unit 90 in the aforementioned manner. Whereupon, following the same procedures as already described, wire extension is carried out. The operation in this case is apparent from the foregoing description and therefore will not be explained here. However, after the completion of wire extension and before swinging the arm assembly 100 back toward the retracted position, the subnozzle 150 is detached from the main nozzle 120'.

As described above, the main nozzle 120' is used individually during the normal wire extension, and the main nozzle 120' and the subnozzle 150 are used in combination during precision wire extension. Thus, the main nozzle 120' may be left attached to the arm assembly 100 for both normal and precision wire extension operations. Consequently, the adjustment required in the first embodiment in mounting the main body 101 of the arm assembly 100, the member 102, and the nozzle portions 121, 122 at the time of replacement of the wire extension nozzles 120 is unnecessary, and accordingly, the operating efficiency is improved.

I claim:

1. An automatic wire extension method, comprising the steps of:
    (a) attaching a first nozzle to an upper wire guide when carrying out normal wire extension through a workpiece with a first initial hole having a diameter suited to normal electric discharge machining, and attaching a second nozzle, having a predetermined nozzle hole diameter smaller than the diameter of a second initial hole, to the upper wire guide when carrying out precision wire extension through the second initial hole whose diameter is smaller than that of the first initial hole and suited to precision electric discharge machining;
    (b) positioning the first nozzle at a first predetermined distance from the workpiece when carrying out normal wire extension, and positioning the second nozzle at a second predetermined distance smaller than the first predetermined distance, from the workpiece when carrying out precision wire extension; and
    (c) feeding a wire electrode through the upper wire guide to the workpiece and then to a lower wire guide while injecting a machining fluid from the first nozzle toward the workpiece when carrying out normal wire extension, and effecting said wire electrode feeding, with the injection of the machining fluid being interrupted, when carrying out precision wire extension.

2. An automatic wire extension method according to claim 1, wherein said second predetermined distance is set to a value such that the second nozzle is positioned in close proximity to the workpiece to facilitate insertion of the wire electrode into the second initial hole.

3. An automatic wire extension method comprising the steps of:
(a) attaching a main nozzle to an upper wire guide when carrying out normal wire extension through a workpiece with a first initial hole having a diameter suited to normal electric discharge machining, and attaching a subnozzle, having a predetermined nozzle hole diameter smaller than a diameter of a second initial hole, to the main nozzle mounted to the upper wire guide when carrying out precision wire extension through the second initial hole whose diameter is smaller than that of the first initial hole and suited to precision electric discharge machining;
(b) positioning the main nozzle at a first predetermined distance from the workpiece when carrying out normal wire extension, and positioning the subnozzle at a second predetermined distance smaller than the first predetermined distance, from the workpiece when carrying out precision wire extension; and
(c) feeding a wire electrode through the upper wire guide to the workpiece and then to a lower wire guide while injecting a machining fluid from the main nozzle toward the workpiece when carrying out normal wire extension, and effecting said wire electrode feeding, with the injection of the machining fluid interrupted, when carrying out precision wire extension.

4. An automatic wire extension method according to claim 3, wherein said second predetermined distance is set to a value such that the subnozzle is positioned in close proximity to the workpiece to facilitate insertion of the wire electrode into the second initial hole.

5. An automatic wire extension apparatus comprising:
nozzle means for directing a wire towards a workpiece;
an upper wire guide;
means for attaching the nozzle means to the upper wire guide when carrying out normal wire extension through a first initial hole of the workpiece having a diameter suitable for normal electric discharge machining, said nozzle means having a first predetermined nozzle hole diameter and a second predetermined nozzle hole diameter smaller than the diameter of the first nozzle hole;
means for positioning the nozzle means at a first predetermined distance from the workpiece with the first nozzle hole aligned with the first initial hole when carrying out normal wire extension and for positioning the second nozzle hole at a second predetermined distance from the workpiece aligned with the second initial hole when carrying out precision wire extension; and
means for feeding a wire electrode through the upper wire guide to the workpiece and then to a lower wire guide while injecting a machining fluid from the nozzle means toward the workpiece when carrying out normal wire extension and for effecting said wire electrofeeding with the injection of the machining fluid interrupted when carrying out precision wire extension.

6. An automatic wire extension apparatus according to claim 5, wherein the nozzle means comprises a main nozzle detachably coupled to the upper wire guide when carrying out normal wire extension, the main nozzle having the first nozzle hole provided therein, and a precision nozzle detachably coupled to the upper wire guide in place of the main nozzle when carrying out precision wire extension, the precision nozzle having the second nozzle hole formed therein.

7. An automatic wire extension apparatus according to claim 5, wherein the nozzle means comprises a main nozzle detachably coupled to the upper wire guide and having the first nozzle hole formed therein, and a subnozzle detachably coupled to the main nozzle and having the second nozzle hole formed therein.

8. An automatic wire extension apparatus according to claim 5, wherein the nozzle means is provided with cutter means and is formed in two halves to permit lateral insertion of the wire electrode.

* * * * *